Jan. 11, 1938.  M. POSTHUMA  2,105,054
GAUGE FOR MEASURING ANGLES
Filed March 30, 1936   2 Sheets-Sheet 1
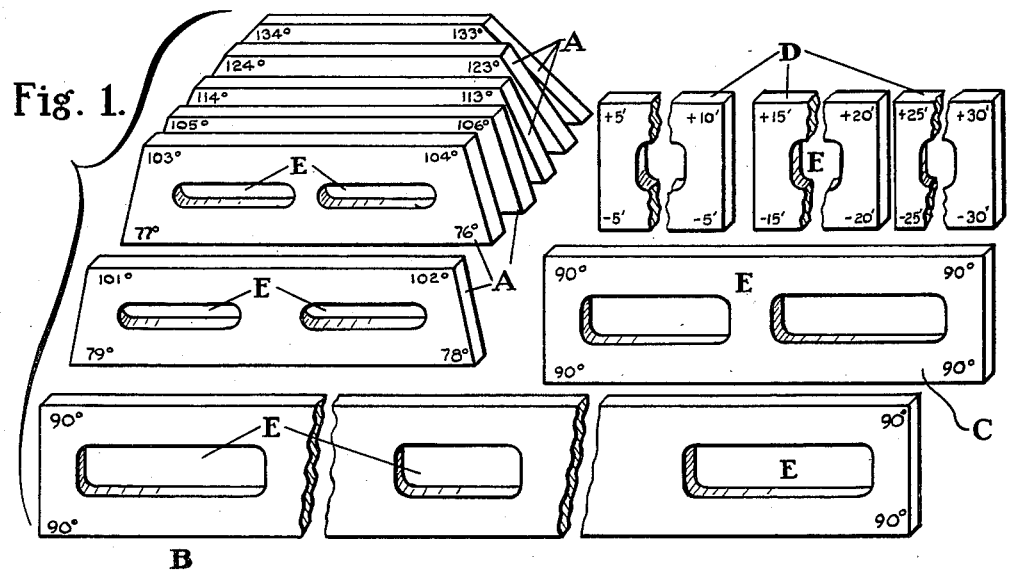
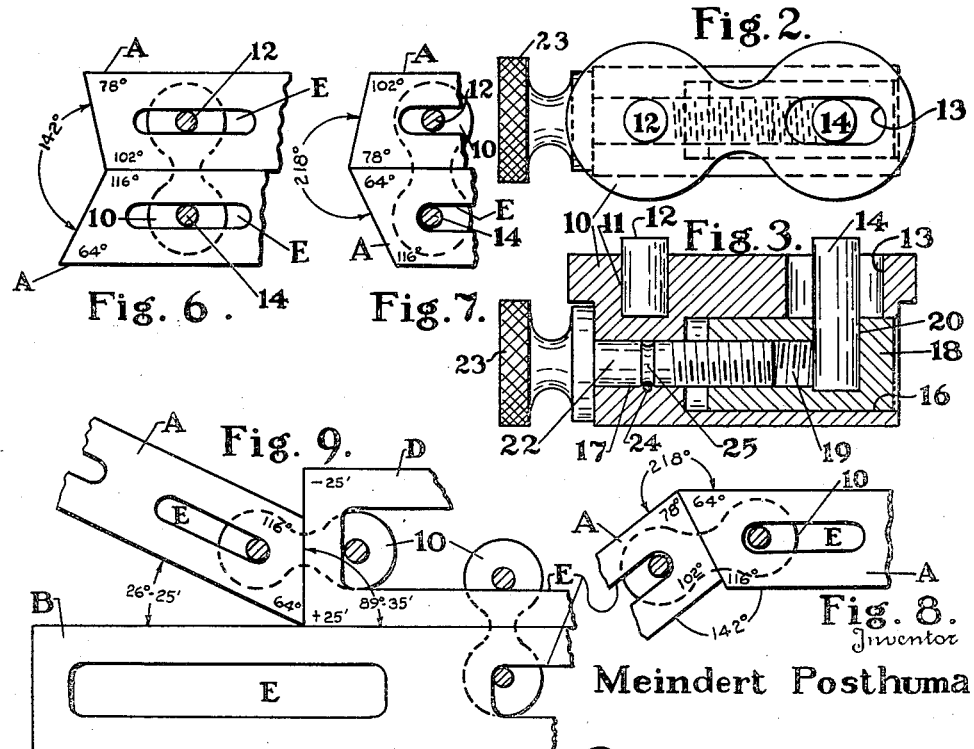
Inventor
Meindert Posthuma
Witness
Robert G. Trumbull
By Clayton F. Jenks
Attorney

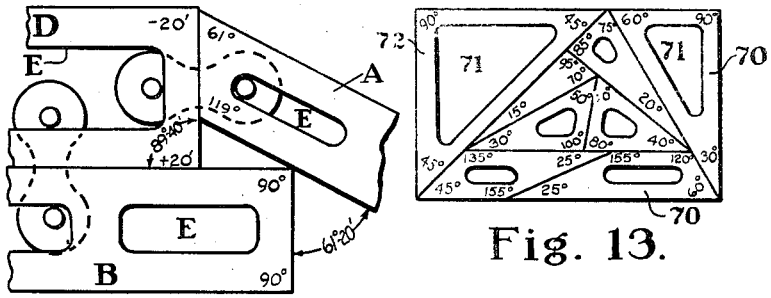
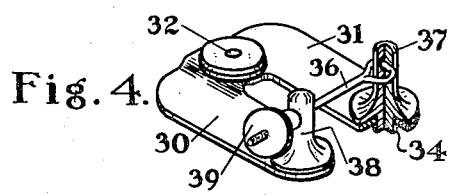
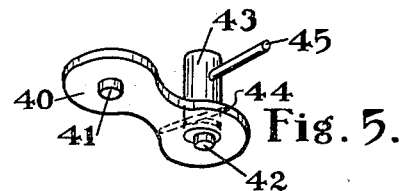
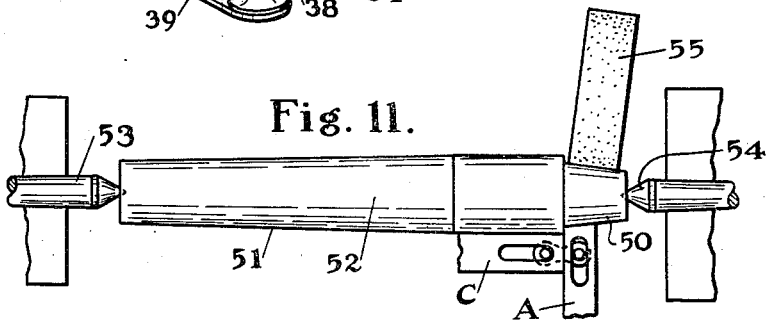
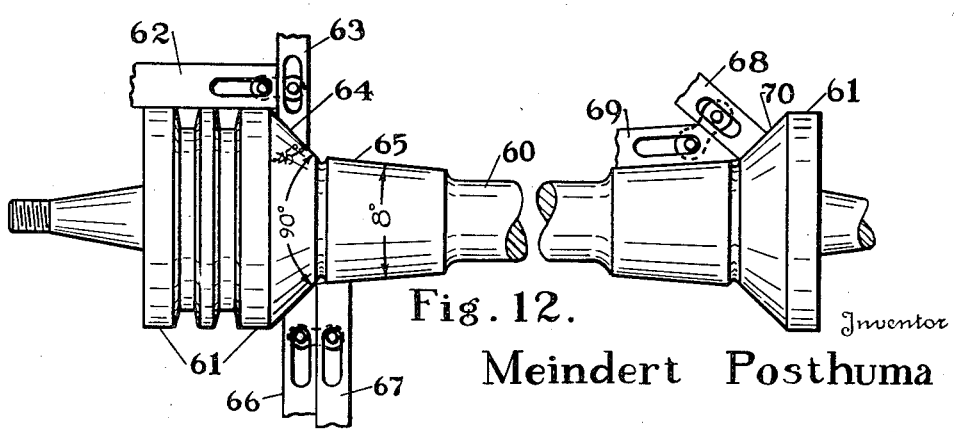

Patented Jan. 11, 1938

2,105,054

UNITED STATES PATENT OFFICE 2,105,054

GAUGE FOR MEASURING ANGLES

Meindert Posthuma, Worcester, Mass.

Application March 30, 1936, Serial No. 71,547

11 Claims. (Cl. 33—75)

This invention relates to a gauge for measuring angles and more particularly to an instrument having a set of accurately shaped gauge plates and clamping members adapted to be combined in various arrangements for measuring angles.

Angles are commonly measured by means of a protractor which usually comprises two pivoted members adapted to be adjusted to desired angles and has a large base plate or a graduated disk or other member that often gets in the way and makes it difficult to measure angles on some types of work pieces of irregular shape. Moreover, the accuracy of measurement depends upon one's ability to set the pivoted arms by observation of the graduation marks on the disk and this is seriously affected in many instances by the type of construction provided for this purpose. Various other defects are inherent in such constructions.

The primary object of this invention is to overcome various difficulties presented by such instruments and to provide an angle gauging device which is universal in its application for measuring angles of all sizes and in various locations, both internal and external and in restricted spaces and whereby the angles may be measured by direct occular comparison with prefashioned gauges of accurate shapes.

In accordance with my invention, I propose to measure angles by means of a set of differently shaped gauge plates having accurately fashioned side and edge faces forming definite corner angles, which may be used individually or arranged in different combinations and there secured by means of a clamping device.

A further object of the invention is to provide a simple and compact set of gauge plates and clamping devices for measuring angles, wherein the various gauge plates are pre-made accurately to such dimensions and shapes that a comparatively small number of plates may be used, by adding the angles of several plates or by using them in association with a straight edge, to measure angles varying from a small fraction of a degree to all angles which need to be measured in a machine shop. Further objects will be apparent in the following disclosure.

Referring to the drawings, which illustrate the preferred embodiment of this invention:

Fig. 1 is a perspective view, with parts broken away, showing the various types of gauge plates employed in this device;

Figs. 2 and 3 are a bottom plan and a sectional view respectively of a clamping device employed to secure two gauge plates together;

Fig. 4 is a perspective view, partly broken away, of a modified form of clamp;

Fig. 5 is a perspective view of still another form of clamp;

Figs. 6 to 8 show diagrammatically, and partly broken away, various arrangements of two gauge plates fastened together with a clamp for use in measuring definite angles;

Figs. 9 and 10 show diagrammatically the arrangement of three plates for measuring angles smaller than 45° and for measuring minutes and degrees;

Fig. 11 shows diagrammatically a work piece mounted in a machine tool and how a given angle may be measured;

Fig. 12 is a similar view showing how another irregular work piece may be measured; and Fig. 13 shows a top plan view of a modified form of a set of gauge plates.

The measurement of angles by means of this device is based on the use of a set of gauge plates having definite, accurately dimensioned angles at their corners which vary by a definite increment and provide all of the required angles within a given range. For example, a set of plates may give all of the angles from 45° to 135° and vary by an increment of 1, 2 or 5 degrees. These may be used individually for occular comparison with angles to be measured, or two or more plates may be juxtaposed in an edge to edge relation whereby their adjacent angles may be combined with one another and with 180° provided by a straight edge. In order to hold them rigidly in a desired combination, a clamping device is provided which has adjustable members cooperating with means, such as a clamping shoulder, on each plate which serves to draw two plates together in an edge to edge relationship.

In the preferred form, the plates are shaped as thin polyhedrons of uniform thickness having parallel side faces of extensive area and bounded by parallel plane faces, herein termed edge faces, which are cut by further plane edge faces at the required angles thereto and which preferably vary by a definite increment throughout the series, such as 1°, so that each plate presents two consecutive angles in the series and their supplements. That is, these plates A, as indicated at the upper left hand portion of Fig. 1, are so shaped as to provide four different angles at their several corners, so that, for example, one plate may provide the angles of 78° and 79° and their supplementary angles 102° and 101°, respectively.

By having the plates differing by one degree, whereby the one next thereto measures 76°, 77°, 104° and 103°, it is possible to measure directly all angles from 44° to 89° and from 91° to 136° by means of 23 plates. The first plate in the A series has the angles of 44°, 45°, 136° and 135° while the last plate provides the angles of 88°, 89°, 92° and 91°. The set also includes a long plate B and a short plate C which serve as straight edges measuring 180° and edges perpendicular thereto which measure 90°. Also a set of three plates D will give angles of 5, 10, 15, 20, 25, and 30 minutes greater or less than 90°, as indicated at the upper right hand portion of Fig. 1.

The degree plates A are stamped at their corners, and preferably on both side faces, with the correct numerals indicating the angles there provided. The minute plates B are preferably marked with the number of minutes off 90° and with plus and minus signs which show that their angles are to be added to or subtracted from the angle of another plate combined therewith. For example, that corner of the plate which is marked with the legend +5 has an angle which is 90° minus 5′ or 89°55′. Similarly, the opposite corner indicated by the legend —5 represents an angle of 90°5′. The other corners of the same plate are shaped to 90° —10′ and 90° +10′. In the preferred form, these various plates are about $\frac{1}{16}$ inch thick, and from ¾ to 1 inch wide and about 4 inches long, except that the long straight edge plate may be 10 or 12 inches long.

By the use of these 28 plates, one may measure all angles of five minute variations which are met in the machine shop. These plates may be mounted in a box having grooves or slide ways whereby the set of plates may be readily seen and removed for use. It is especially important that the plates be shaped accurately, not only as to their corner angles but also to insure that the edge faces are plane ground and square with or perpendicular to the side faces so that the plates may be clamped together with their edge faces juxtaposed, while the two sides are in parallel planes. Each of the plates is provided with one or more inner clamping surfaces, such as are provided by the holes E, which are so shaped and arranged as to provide inner faces located at substantially the same distances from the opposite edges and ends of the plates or in such positions that a suitable clamping device may be employed to hold the plates together in various edge to edge arrangements. It will be appreciated that shoulders on projecting lugs or depressed portions on the plates, or other suitable structural features, may be substituted for the slot faces E and used with the clamps for securing the plates together. The parts above described are therefore illustrative merely of the preferred form which the invention may take.

The clamp preferably comprises, in general, two pins adapted to be inserted in and to engage the clamping surfaces provided by the sides of the slots E of two of the plates, which are moved relatively towards each other to clamp the adjacent plate edges together by means of a screw or a cam or other suitable mechanism. Various modifications of the clamping device are shown in Figs. 2, 3, 4, and 5. The form illustrated in Figs. 2 and 3 comprises a base member 10 provided with a recess 11 within which a pin 12 is firmly secured. The base also has an elongated slot 13 within which a second pin 14 may slide. These pins 12 and 14 are preferably cylindrical in shape and are adapted to fit freely within the slots E in the gauge plate, but their surfaces are accurately made with their axes perpendicular to the face of the base 10 so that when the base 10 rests on two plates with the pins in the slots E, the pins can be adjusted to clamp the plates rigidly therebetween.

The clamping faces E of the plates will of course be accurately shaped to be perpendicular to the side faces of the plates and therefore parallel with the contacting edges of the pins 12 and 14. Also, these clamping surfaces on the plates should be extensive in size so that the clamps and plates may be arranged in various positions and the clamping force will be applied, in so far as possible, in a direction substantially perpendicular to the clamped edge faces. Although long slots have been shown in the plates of Fig. 1, yet it is feasible and often desirable that the openings E be made as indicated in Fig. 13 in which the clamping faces are substantially parallel with the outer edge faces and equidistant therefrom so that the plate rim is of substantially equal width throughout. The ends of each slot or the corner portions of the opening E may be rounded as shown to fit the round pins 12 and 14.

The base 10 has a cylindrical hole 16 communicating with a smaller opening 17 aligned therewith. Slidingly mounted within the hole 16 is a slide 18 which has a screw threaded socket 19 arranged axially parallel with its line of movement. A hole 20 at right-angles to the socket serves for mounting the cylindrical pin 14, which is forced therein with a driving fit or is otherwise made so as to be rigid with the sliding member 18. A screw 22 is threaded into the socket 19 and arranged for moving the slide 18 and its pin 14 back and forth as required. The opposite end of the screw 22 is provided with a knurled head 23 for rotating the screw, and a pin 24 fixed in the base 10 and located in an annular groove 25 in the screw 22 serves to hold the screw longitudinally stationary when it is rotated and thereby moving the slide 18 back and forth with its pin 14. Hence, if the pins 10 and 12 are properly placed in the slots E of two plates arranged edge to edge, as shown in Figs. 5 to 10 inclusive, the pins 10 and 12 may serve to clamp the plates together. It is preferred that the outer ends of the pins 10 and 12 be flush with the faces of the plates so as to give the maximum clamping effect without permitting the ends of the pins to project through the plates and interfere with their use.

The clamping device shown in Fig. 4 comprises two arms 30 and 31 having overlapping portions hinged together by a pin 32 passing therethrough. The two arms carry downwardly projecting pins 34, corresponding with the pins 10 and 12 of the device shown in Figs. 2 and 3, which serve to engage the inner clamping surfaces of the slots E in the gauge plates. A tension member 36 is hinged at one end to a post 37 fixed on the arm 31 as shown, and its other end passes freely through a hole in the post 38 mounted rigidly on the other arm 30. A screw thread on the end of the tension member 36 and a knurled nut 39 engaging the side of the post 38 serve to draw the two arms together and clamp the pins 34 in the slots E of the plates.

The modification shown in Fig. 5 comprises a base plate 40 having one clamping pin 41 rigidly fixed thereto. A second pin 42 is formed integrally with but eccentric to a cylindrical member 43 mounted for rotation about its axis within a hole in the plate. A pin 44 set in the plate engages an annular groove (not shown) on the member 43 and permits rotation thereof but prevents endwise movement. A handle 45 serves to rotate the pivotal member 43 and thus to move the eccentrically mounted cylindrical pin 42 towards and from the other pin 41. The parts are so shaped and arranged that they will serve to wedgingly clamp two gauge plates together in an edge to edge relationship.

It will now be appreciated that for measuring angles greater than 44° C. and up to 135°, one may use the plates A and B for direct comparison with angles in certain types of work and without the aid of any clamping devices provided it is not desired to measure fractions of degrees. For measuring other angles two plates may be used, and these may be clamped together in all sorts of positions, a few of which are illustrated in Figs. 6, 7, and 8. As is readily apparent by inspection of Figs. 6 and 7, the ends of the two plates selected, which provide the angles 78° and 102° at one end of one plate and 64° and 116° at the corresponding end of the other plate, may be clamped together so as to add the angles 54° and 78° and thus measure an angle of 142° (Fig. 6) or to add the angles 102° and 116° and obtain 218° (Fig. 7). The plates may be combined with their ends together, as shown in Fig. 8, so that one may use the long edge faces of the plates instead of their short edge faces. The plates in the position shown in Fig. 8 will measure 218° at the upper edge and 142° at the lower. The clamp in each of these views is indicated by the dotted outlines of the base 10 and the pins 12 and 14 in sectional or plan view. A 90° plate and another will give angles from 135° to 180° by the arrangement of Fig. 6 and from 180° to 225° by the scheme of Fig. 7, if the plates of this particular set are used. Angles from 270° to 315° may be obtained by means of a single plate, i. e. by noting the angle of 360° minus the angle of the plate. Above 315°, the scheme of Fig. 9 will give the required angle by subtraction from 360°.

If it is desired to measure an angle smaller than 45°, and in minutes, then one of the minute plates D is clamped against a straight edge B as indicated in Fig. 9. It will be observed that the lower angle of plate D is labeled "+25" and that it actually measures 89°35'. If now a third plate A having a 64° angle is clamped against the end of plate D as shown, then it makes an angle of 26° plus 25' with the straight edge. That is why the minute plate is marked with a plus sign. Its value is added to the angle determined by the other plate. It is also to be noted that plates A and B are not clamped directly together, since it is necessary that the long edge faces of plates B and D contact and lie in parallelism and that the short edge faces of plates A and D similarly lie in contact. The clamps are so constructed that the plates may be laid down on a flat surface and there clamped together and then be transported and used as desired for inspecting the angle to be measured. Fig. 10 shows how a set of three plates may be differently arranged for measuring the angle of 61°20'. In that case, one adds the degree angle of 61° directly to the minute angle of 20', by using the end of the 90° plate as one leg of the angle.

If the short 90° plate C is substituted for the minute plate D in Figs. 9 and 10, then the angles 26° and 61° are respectively obtained. This combination of a 90° plate, a straight edge and a third angle plate is therefore particularly useful for measuring small angles below 45°, as indicated in Fig. 9. The drawings illustrate only a few of the possible arrangements of the plates. By one scheme or another, all angles met in a machine shop may be measured. If the space is restricted, then the ends of the plates may be used, as shown in Figs. 6 and 7. If there is plenty of room, the long edges of the plates (Fig. 8) may be used. The plates serve for measuring both external angles (Fig. 6) and angles made by internal surfaces (Fig. 7). They can be used in all sorts of places.

Fig. 11 indicates how the gauging device may be used. If it is desired to measure the taper of the surface 50 relative to the cylindrical face 51 of a spindle 52 while it is mounted on the head stock and tail stock centers 53 and 54 of a grinding machine having the grinding wheel 55 in place against the work, then the plates may be clamped as shown. The 90° plate C, which has its ends perpendicular to its long edge, is arranged to lie against the true cylindrical surface 51 previously provided and parallel with its axis. If the surface 50 is to make the angle of 10° with the axis, then the 80° plate is selected and clamped in the arrangement shown. After the surface 50 has been ground, if the plates fit the contacting work surfaces and shut out the light, then the job has been done properly. Otherwise, grinding is continued. It will be particularly noted that it is not necessary to remove the work piece and change its grinding set up, as would be the case if various types of protractor were used for measuring the angle.

Fig. 12 shows further applications of the device for measuring a work piece of very irregular shape, which has many angles or surfaces not easily reached by the standard protractor. The work piece 50 is initially provided with true cylindrical surfaces 61 which are concentric with the axis of the piece. Hence, one may assemble the two gauge plates 62 and 63 as indicated to measure the 45° angle which the frustrum of the cone 64 makes with the true cylindrical surface. The 8° angle made by the surface 65 with a line parallel with the axis may be obtained by the gauge plates 66 and 67 arranged in parallel, it being noted that plate 66 is so selected that it makes an angle of 45° with the axis as determined by the measurement of plate 63. Likewise, a 90° plate 68 may be used with a 53° plate 69, as indicated at the right hand end of the figure, provided the frustrum surface 70 has been previously found to lie at 45° to the axis. These examples are sufficient to show the universal applicability of the gauge plates for all sorts of situations.

In view of the above disclosure, it will now be appreciated that various modifications of this device may be made. For example, as shown in Fig. 13, the plates 70 may be of triangular shape and provided with slots, as shown in the forms above described, or with large openings 71 therethrough, as shown in Fig. 13, whereby the individual pieces are of skeleton formation. In this case, the rim 72 of each plate is of substantially the same width throughout and is of such size and shape that the pieces will cooperate with the clamping devices above described for assembling two or more of the parts and measuring angles by the addition of the angles of the individual pieces. It will be apparent that the shapes of these various triangular pieces may vary widely. For example, the eight-piece set shown in Fig. 13 is capable of measuring all angles of 5° increments from 5° to 90°, together with such angles as may be made by adding together two or more of these gauge pieces. This set is useful in a shop which does not require finer measurements than the 5°.

It will be observed that in the arrangement of gauge plates shown in Fig. 13, they have been so cut to shape that they fit together as a rectangle, thus avoiding waste of space within a supporting casing and holding them properly in place as well as providing other advantages. The bottom of the metal casing may be marked with lines if desired to show the proper locations of the gauge plates and thus readily aid in assembling the plates in the casing. A set constructed in this and similar fashions may be used separately or with the clamping members above described.

I claim:

1. An angle gauging instrument comprising a set of a considerable number of flat, parallel sided angle plates of uniform thickness having straight edge faces perpendicular to the side faces and meeting at different, predetermined, accurate angles which are of such sizes that the plates may be used separately and in combinations of two or three plates suitably selected from the set to measure directly all angles within the semicircle which vary uniformly by increments of not over 5 degrees, and a clamping device and means on each plate arranged to cooperate therewith which will serve to clamp together any edge face of one plate against any edge face of a second plate with either side of each plate exposed and the angle between the plates determined solely by the shapes of the contacting plates, so that the assembled plates will lie flat on a plane surface with the desired measuring angle unobstructed.

2. An angle gauging instrument of the type covered by claim 1 wherein each plate has two parallel plane edge faces cut by two similar non-parallel edge faces, and the angles of the plates in the set vary by uniform increments, and each plate is cut away to provide internal shoulders at substantially the same distances from each edge face and the clamping device comprises relatively movable pins which engage opposed shoulders on two plates and means for drawing them towards each other in clamping relationship.

3. An angle gauging instrument of the type covered by claim 1 comprising two angle plates and a base plate having a straight edge face and a clamping shoulder associated therewith, and two clamping devices, one of which clamps an edge face of any given angle plate against said straight edge face and the other clamping device secures a second angle plate to the other two assembled plates in an angle measuring relationship.

4. An angle gauging instrument of the type covered by claim 1 in which the set of plates includes angle plates adapted for measuring whole degrees and further angle plates for measuring minutes, the latter plates having straight edge faces and other edge faces making angles therewith of 90° plus or minus a definite number of minutes which vary by uniform increments, and wherein both the degree and the minute angle plates have shoulders so arranged that the two plates may be clamped in an arrangement for measuring degrees and minutes.

5. An angle gauging instrument comprising a set of flat, parallel sided plates of uniform thickness, each of which has straight edge faces and a clamping shoulder associated therewith, and a clamping device having relatively movable pins engageable with the shoulders of two plates and means for drawing them together in a rigid angle measuring arrangement, the set of plates including a plate providing a straight edge face, a second plate having two edge faces for measuring a degree and a third plate having two edge faces meeting at an angle which differs from 90° by a definite number of minutes, not over 30', whereby the assembly of the three plates serve to measure an angle in minutes and degrees which differs from any angle of the plates.

6. An angle gauging instrument of the type covered by claim 1 in which each plate has a clamping shoulder so located close to each edge face that the plates may be clamped rigidly together in all desired edge to edge relations and the clamping device comprises means for engaging any of said shoulders and releasably but positively forcing the plates together.

7. An angle gauging instrument of the type covered by claim 1 in which each plate is cut away to provide a set of internal, plane faced shoulders substantially parallel with and equidistant from the edge faces, and the clamping device has projecting clamping pins arranged to engage the shoulders on opposed plates and means for positively drawing the pins towards each other to hold the plates rigidly together.

8. An angle gauging instrument of the type covered by claim 1, wherein the set comprises plates having two parallel plane edge faces and two non-parallel edge faces cutting the outer faces at angles which differ throughout the set, and each plate is cut away to provide internal clamping shoulders so located relative to the adjacent edge faces that any edge face of each plate may be clamped against any edge of another plate by the clamping device.

9. An angle gauging instrument of the type covered by claim 1 in which the set comprises plates having two parallel plane edge faces and two non-parallel edge faces cutting the outer faces at angles which differ throughout the set, and individual plates that are triangular in shape, each plate of the set being cut away to provide internal clamping shoulders so located relative to the adjacent edge faces that the plates may be clamped together in all desired relations.

10. An angle gauging instrument comprising a set of flat angle plates having straight edge faces meeting at predetermined and different angles, each plate having a clamping shoulder located between its opposed edge faces, and a removable clamping device having two relatively movable pins arranged to engage a shoulder on each of two plates in the set and means for moving said pins and releasably but positively forcing the plates together in an edge to edge relationship.

11. An angle gauging instrument comprising a set of flat angle plates having straight edge faces meeting at predetermined and different angles, each plate having a clamping shoulder located between its opposed edge faces, and a removable clamping device having two relatively movable pins arranged to engage a shoulder on each of two plates in the set and manually adjustable, screw threaded mechanism for drawing the pins towards each other and thereby clamping the two plates rigidly together.

MEINDERT POSTHUMA.